United States Patent
Rasigade (10) Patent No.: US 12,482,572 B2
(45) Date of Patent: Nov. 25, 2025

(54) METHOD FOR DETECTING AN INFECTIOUS TRANSMISSION IN A POPULATION

(71) Applicants: HOSPICES CIVILS DE LYON, Lyons (FR); UNIVERSITE CLAUDE BERNARD LYON 1, Villeurbanne (FR); ECOLE NORMALE SUPERIEURE DE LYON, Lyons (FR); CENTRE NATIONAL DE LA RECHERCHE SCIENTIFIQUE (CNRS), Paris (FR); INSERM (Institut National de la Sante et de la Recherche Medicale), Paris (FR)

(72) Inventor: Jean-Philippe Rasigade, Lyons (FR)

(73) Assignees: HOSPICES CIVILS DE LYON, Lyons (FR); UNIVERSITE CLAUDE BERNARD LYON 1, Villeurbanne (FR); ECOLE NORMALE SUPERIEURE DE LYON, Lyons (FR); CENTRE NATIONAL DE LA RECHERCHE SCIENTIFIQUE (CNRS), Paris (FR); INSERM (INSTITUT NATIONAL DE LA SANTE ET DE LA RECHERCHE MEDICALE), Paris (FR)

( * ) Notice: Subject to any disclaimer, the term of this patent is extended or adjusted under 35 U.S.C. 154(b) by 219 days.

(21) Appl. No.: 18/252,831

(22) PCT Filed: Nov. 16, 2021

(86) PCT No.: PCT/FR2021/052021
§ 371 (c)(1),
(2) Date: May 12, 2023

(87) PCT Pub. No.: WO2022/101596
PCT Pub. Date: May 19, 2022

(65) Prior Publication Data
US 2024/0006082 A1    Jan. 4, 2024

(30) Foreign Application Priority Data
Nov. 16, 2020 (FR) ..................... 2011693

(51) Int. Cl.
*G16H 50/80* (2018.01)
*G16B 20/00* (2019.01)
(Continued)

(52) U.S. Cl.
CPC ............ *G16H 50/80* (2018.01); *G16B 20/00* (2019.02); *G16B 40/10* (2019.02); *G16H 10/40* (2018.01); *G16H 70/60* (2018.01)

(58) Field of Classification Search
CPC ........ G16H 50/80; G16H 10/40; G16H 70/60; G16B 20/00; G16B 40/10; G16B 20/40
(Continued)

(56) References Cited

U.S. PATENT DOCUMENTS

2017/0316181 A1* 11/2017 Kass-Hout ............. G06Q 50/26
2020/0181720 A1*  6/2020 Abudayyeh .......... C12N 15/115

OTHER PUBLICATIONS

Tsutsui et al., Automated detection of outbreaks of anti-microbial-resistant bacteria in Japan, The Journal Of Hospital Infection, 2018, 102(2), pp. 226-233 (Year: 2018).*
Yan et al., Investigating transmission of Mycobacterium abscessus amongst children in an Australian cystic fibrosis center, Journal Of Cystic Fibrosis, 2019, 19(2), pp. 219-224 (Year: 2019).*
Manigart Olivier et al. A gp41-Based Heteroduplex Mobility Assay Provides Rapid and Accurate Assessment of Intrasubtype Epidemiological Linkage in HIV Type 1 Heterosexual Transmission Pairs, Aids Research and Human Retroviruses., 2012, 28(12), 1745-1755.
(Continued)

*Primary Examiner* — Joy Chng
(74) *Attorney, Agent, or Firm* — Arrigo, Lee, Guttman & Mouta-Bellum LLP (57) ABSTRACT

A method for detecting an infectious transmission in a population is disclosed. For a plurality of infectious agent isolates, each associated with an individual of the population, a vector can be obtained with values descriptive of the
(Continued)

isolate and distance between two isolates determined. An infectious transmission in the population can be detected as a function of the estimated probabilities of direct infectious transition between each pair of individuals.

16 Claims, 3 Drawing Sheets

(51) Int. Cl.
 *G16B 40/10* (2019.01)
 *G16H 10/40* (2018.01)
 *G16H 70/60* (2018.01)
(58) Field of Classification Search
 USPC .......................................................... 705/2–3
 See application file for complete search history.

(56) References Cited

OTHER PUBLICATIONS

Yan Jennifer et al. Investigating transmission of Mycobacterium abscessus amongst children in an Australian cystic fibrosis centre, Journal of Cystic Fibrosis, 2019, 19(2), 219-224.

Song Jenny Z. et al. Significance of plasma and peripheral blood mononuclear cell derived HIV-1 sequences in establishing epidemiologic linkage between two individuals multiply exposed to HIV-1, Microbial Pathogenesis, 1999, 26(6), 287-298.

Tsutsui et al. Automated detection of outbreaks of anti-microbial-resistant bacteria in Japan, The Journal of Hospital Infection, 2019, 102(2), 226-233.

* cited by examiner

FIG. 1

(a) Sampling isolates of infectious agents (b) Obtaining vectors of values representative of the isolates (c0) Calculation of reference distance $D_{XY}$ between X and Y (c1) Calculation of first and second numbers n(X), n(Y)

(c2) Estimation of a probability $N_{XY}$ of infectious transmission between X and Y (d) Detection of transmission in the population
Action

METHOD FOR DETECTING AN INFECTIOUS TRANSMISSION IN A POPULATION

CROSS-REFERENCE TO RELATED APPLICATIONS

This application is a U.S. National Stage entry of International Application No. PCT/FR2021/052021, Nov. 16, 2021, which claims priority to French Application No. 2011693, filed Nov. 16, 2020.

FIELD OF THE INVENTION

The present invention relates to the field of epidemiological surveillance, and in particular relates to a method for detecting an infectious transmission in a population.

DESCRIPTION OF RELATED ART

The basics of epidemiological surveillance (detection of new epidemics and control of their spread) can be reduced to the following question: if two isolates of pathogens are found in different individuals, what is the probability that the isolates of pathogens have been transmitted between these individuals, whether directly, indirectly or from a common source?

The notion of transmission is related to the existence of a "common ancestor" to pathogen isolates found in these distinct individuals (known as hosts), and more precisely to the time elapsed since the pathogen isolates diverged from their common ancestor, technically called Time to the Most Recent Common Ancestor (TMRCA).

In pathogens, each detectable divergence event coincides with a transmission event in the (most frequent) case where the rate of transmission is greater than the rate of evolution. Therefore, the TMRCA of a pair of pathogen isolates gives an estimate of the age of the last transmission event in the ancestry of the pathogen isolates. In other words, the TMRCA can be interpreted as an estimate of the length of the chain of (direct or indirect) transmission involving the hosts of the existing pathogen isolates.

A short TMRCA suggests a short chain of transmission and vice versa. In summary, the likelihood that a pair of isolates have been involved in recent transmission is inversely proportional to their TMRCA.

For example, it can be established that transmission has taken place between hosts if the TMRCA is below a threshold characteristic of the pathogen, for example 14 days for the SARS-CoV-2 coronavirus.

TMRCA is unfortunately not directly observable and must be estimated from the observable characteristics of pathogen isolates, usually by measuring "dissimilarity" between isolates.

In particular, it is possible to sequence the genome of the isolates, and measure the "genetic distance" between the isolates, that is to say the number of differences between the DNA sequences of the isolates. These differences accumulate in fact as a result of DNA mutations, the number of which is directly related to the TMRCA.

This genetic method is satisfactory, but is slow and expensive. It usually takes several days to get the sequencing results, which is problematic in an epidemic context. Moreover, the limits of the genetic method do not make it applicable to automated epidemic surveillance on a large number of isolates.

Alternatively, other characteristics of the isolates can be used to estimate the probability of transmission between a pair of isolates. In this case, the unavailable genotypic information is replaced by available phenotypic information generated within the framework of microbiological diagnostics, which are easily obtainable. Phenotypic information generally includes the species of isolates and their antimicrobial susceptibility profile. The problem is that it is difficult to calculate dissimilarity, and it is sufficient to consider that only isolates that share identical profiles have been transmitted recently. This "identity implies transmission" approach is the cornerstone of current methods for automated outbreak detection using phenotypic data (WHONET-SaTSCan approach, see Tsutsui, A., Yahara, K., Clark, A., Fujimoto, K., Kawakami, S., Chikumi, H., . . . . Stelling, J. (2019). *Automated detection of outbreaks of antimicrobial-resistant bacteria in Japan. The Journal of Hospital Infection*, 102(2), 226-233. doi: 10.1016/j.jhin.2018.10.005).

This approach is much simpler but less reliable. Unlike the genetic method which is quantitative in nature (because a number of genetic differences must be reached to exclude transmission (David and al., 2019)), the "identity implies transmission" approach is binary and can wrongly exclude transmissions based on very rapidly evolving markers such as antimicrobial resistance. However, resistance to several antimicrobials can emerge and regress in the same patient (Choi and al., 2008) and epidemiologically related isolates can have different resistance profiles. Conversely, some pathogens evolve very slowly and even identity is not sufficient to guarantee the existence of transmission.

It would therefore be desirable to have a new solution for detecting an infectious transmission in a population, which is as reliable as genetic methods, while being simpler, more effective and less costly.

BRIEF SUMMARY OF THE INVENTION

According to a first aspect, the present invention relates to a method for detecting an infectious transmission in a population, the method being characterized in that it comprises implementing, by data processing means of a client, steps of:
 (b) For a plurality of infectious agent isolates each associated with an individual of said population, obtaining a vector with values descriptive of said isolate;
 (c) for each pair of a first isolate and a second isolate of said plurality respectively associated with a first individual and a second individual of said population:
  (c1) calculating a first number of isolates corresponding to the number of isolates of said plurality having a distance to the first isolate less than or equal to a reference distance between the first and second isolates, and a second number of isolates corresponding to the number of isolates of said plurality having a distance to the second isolate less than or equal to said reference distance between the first and second isolates, each distance between two isolates being representative of a dissimilarity between the vectors of values descriptive of these two isolates;
  (c2) estimating a probability of direct infectious transmission between the first and second individuals as a function of said first and second number of isolates;
 (d) Detecting or not detecting an infectious transmission in said population as a function of the estimated probabilities of direct infectious transmission between each pair of individuals.

According to advantageous and non-limiting characteristics:

Step (c) comprises a preliminary sub-step (c0) of calculating the reference distance between the first and second isolates.

Said probability of direct infectious transmission between the first and second individuals decreases when the first and/or the second number of isolates increases.

Said probability $T_{XY}$ of direct infectious transmission between the first and second individuals is given by the formula $T_{XY}=1/(1+n(X)+n(Y))$, where $n(X)$ is the first number of isolates and $n(Y)$ is the second number of isolates.

Said vector with values descriptive of an isolate comprises a resistance profile of the isolate and/or a list of protein peaks of the isolate.

Step (b) comprises, for each isolate of said plurality, the implementation of an antibiogram to determine said resistance profile of the isolate and/or the implementation of a mass spectrometry analysis of the isolate to determine said list of protein peaks of the isolate.

The method comprises a step (a) of obtaining said plurality of isolates from biological specimens taken from a plurality of individuals of said population.

Infectious transmission in said population is detected in step (d) if there is at least one pair of a first isolate and a second isolate of said plurality respectively associated with a first individual and a second individual of said population such that said probability of direct infectious transmission between the first and second individuals estimated in step (c2) is greater than a decision threshold.

Step (c) is also implemented for each pair of a first isolate and a second isolate of said plurality associated with the same individual of said population so as to estimate a reference probability, step (d) comprising the calculation of said decision threshold as a function of said probabilities of direct infectious transmission and of said reference probabilities.

Step (d) comprises the implementation of an action on said population according to the result of the detection.

According to a second aspect, the invention relates to an item of equipment for detecting an infectious transmission in a population, characterized in that it comprises data processing means configured to implement steps of:

(b) For a plurality of infectious agent isolates each associated with an individual of said population, obtaining a vector with values descriptive of said isolate;

(c) for each pair of a first isolate and a second isolate of said plurality respectively associated with a first individual and a second individual of said population:

(c1) calculating a first number of isolates corresponding to the number of isolates of said plurality having a distance to the first isolate less than or equal to a reference distance between the first and second isolates, and a second number of isolates corresponding to the number of isolates of said plurality having a distance to the second isolate less than or equal to said reference distance between the first and second isolates, each distance between two isolates being representative of a dissimilarity between the vectors of values descriptive of these two isolates;

(c2) estimating a probability of direct infectious transmission between the first and second individuals as a function of said first and second number of isolates;

(d) Detecting or not detecting an infectious transmission in said population as a function of the estimated probabilities of direct infectious transmission between each pair of individuals.

According to a third aspect, the invention relates to a system comprising an item of equipment according to the second aspect and a server comprising data storage media storing a database of infectious agent isolates, and optionally an item of equipment for the biological analysis of infectious agent isolates.

According to a fourth and a fifth aspect, the invention relates to a computer program product comprising code instructions for the execution of a method according to the first aspect of detecting an infectious transmission in a population; and a computer-readable storage medium on which a computer program product comprises code instructions for the execution of a method according to the second aspect of detecting an infectious transmission in a population.

BRIEF DESCRIPTION OF THE SEVERAL VIEWS OF THE DRAWINGS

Other characteristics and advantages of the present invention will appear upon reading the following description of a preferred embodiment. This description will be given with reference to the appended drawings in which.

DETAILED DESCRIPTION OF THE INVENTION

Architecture

The invention relates to a method for detecting an infectious transmission in a population. "Infectious" here refers to any transmissible infection, said infection involving an infectious agent, that is to say a pathogen, in particular a virus, a bacterium, a parasite, a fungus, etc. In the rest of the description, reference will be made to infectious agent isolates, that is to say samples each isolated from an infectious agent from a biological specimen taken from an individual of said population. Thus, each isolate is associated with an individual of said population, called the "host" of the isolate. It is noted that it is quite possible to have several isolates associated with the same individual, in particular over time (case of multiple samples on different dates), and it is even desirable for the implementation of a preferred embodiment of the invention, see below. It is also noted that the pathogenic isolate may exist in a commensal state in the host, which does not necessarily have a clinical disease.

Infectious transmission in the population means the existence of at least one pair $P_X$, $P_Y$ of individuals in the population P ($P_X$, $P_X \in P$) such that $P_X$ and $P_Y$ share the same infectious origin, that is to say either $P_X$ transmitted the infection directly to $P_Y$, or $P_Y$ transmitted the infection directly to $P_X$, or $P_X$ and $P_Y$ were infected concomitantly (for example by having touched the same object), in other words the existence of contamination involving both $P_X$ and $P_Y$. This is called infectious transmission directly between $P_X$ and $P_Y$. It is also possible to say that $P_X$ and $P_Y$ are part of the same "cluster". This contrasts with a case in which $P_X$ and $P_Y$ would have acquired the infection independently via an intermediate host, for example if two individuals $P_{X'}$ and $P_{Y'}$—potentially not belonging to said population—had been infected concomitantly but $P_{X'}$ had infected $P_X$ and $P_{Y'}$ had infected $P_Y$. In the remainder of this description, for convenience, $P_X$ will be called the "first individual" and $P_Y$ will be called the "second individual".

As explained in the introduction, the existence or otherwise of a direct transmission between $P_X$ and $P_Y$ is related to the length of the chain of transmission, and thus to the "recent" nature of the original event that led to the joint infection of $P_X$ and $P_Y$, that is to say in a given time window. For example, in the case of transmission via $P_{X'}$ and $P_{Y'}$, the chain of transmission is longer, and the original event (contamination of $P_X$ and $P_Y$) is "old" so that there is no direct transmission between $P_X$ and $P_Y$ within the meaning of the invention.

To reformulate, it is possible to consider that the property "there is a direct transmission between $P_X$ and $P_Y$" is equivalent to "the TMRCA is below a given threshold".

The result of said detection can be binary (proven transmission or not), or probabilistic, that is to say the present method estimates a probability of direct infectious transmission between individuals in said population.

Said population is a set of identified individuals, for example the patients of a care unit, of a service, of a hospital, of a medico-social establishment, etc. As will be seen, the present method is particularly effective and can be applied to large populations and involve several thousand or even tens of thousands of isolates (typically 100000 isolates per year in a hospital-whereas genetic methods capped at 300 isolates).

Figure 1:
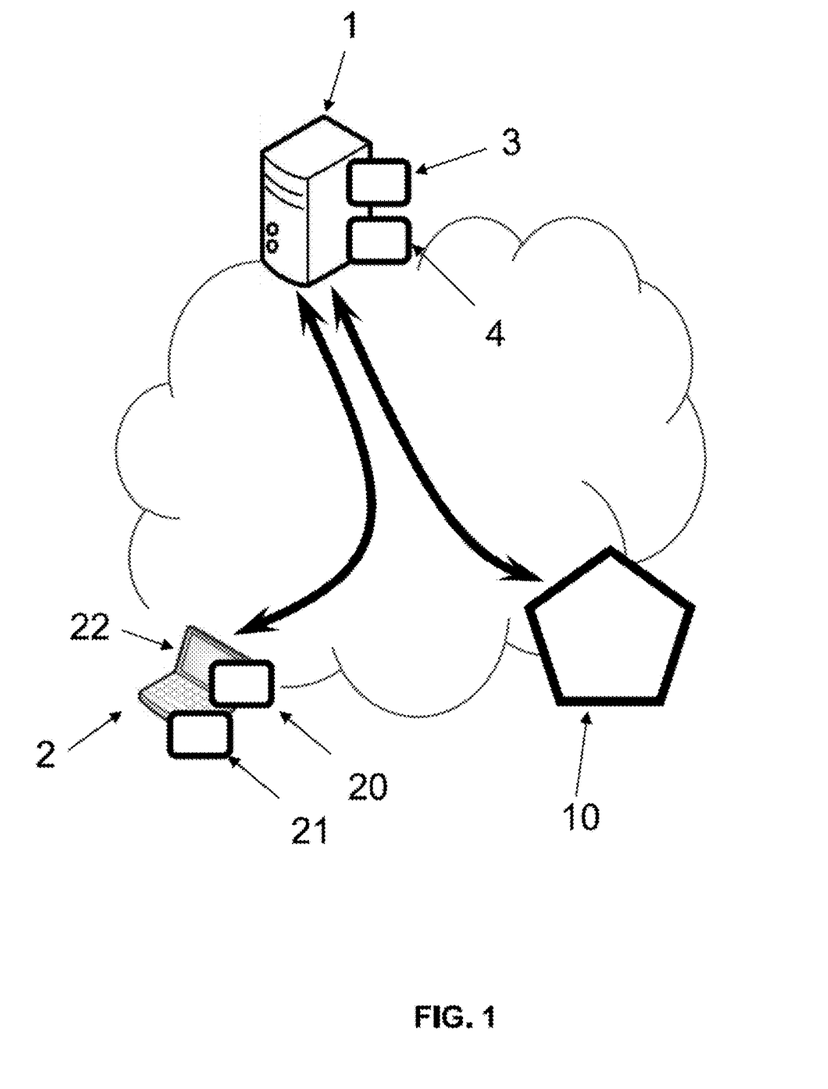
FIG. 1 is a diagram of an architecture for implementing the method according to the invention.

The present method is implemented within an architecture as shown by FIG. 1, thanks to a server 1 and a client 2. The server 1 is a patient data management item of equipment, for example a central server of a hospital, and the client 2 is a user item of equipment (implementing the detection method), for example another server of a doctor or of a hospital.

It is quite possible that the two devices 1, 2 are combined in the form of a remote device, generally secure for data confidentiality issues, with access from a terminal such as a consumer item of equipment, in particular a desktop computer, laptop, etc. The server 1 is typically connected to biological analysis items of equipment 10 such as a mass spectrometer, see below.

In all cases, each item of equipment 1, 2 is typically a remote computer item of equipment connected to a local network or an extended network such as the Internet network for the exchange of data. Each comprises data processing means 3, 20 of the processor type, and data storage media 4, 21 such as a computer memory, for example a flash memory or a hard disk. The client 2 typically comprises a user interface 22 such as a screen for interacting, even if, as explained, it can be deported to a remote terminal.

The server 1 advantageously stores, as will be seen, a database of infectious agent isolates, in which each isolate is represented by a vector with values descriptive of said isolate. It is repeated that isolate means, as its name indicates, an isolated sample of an infectious agent in a biological specimen (that is to say a homogeneous population of this infectious agent—for example a single bacterial cell or a bacterial colony), and said vector of an isolate describes in particular the infectious agent of this isolate.

In a known manner, said vector with values descriptive of an isolate can comprise a resistance profile of the isolate (which is categorical (susceptible/intermediate/resistant) and/or quantitative (minimum inhibitory concentration)) and/or a spectrum such as a list of protein peaks of the isolate (for example from analysis by mass spectrometry, in particular MALDI-ToF).

It should be noted that said vector with values descriptive of an isolate can alternatively or in addition comprise morphological characteristics of the colonies of the isolate (pigmentation, mucosal aspect), or even genotypic information of the isolate (DNA sequences).

The presence of DNA sequences may seem surprising in the context where it is precisely sought to avoid resorting to sequencing, but if genotypic information is available, it can be used perfectly (for example, methods currently under development will be led to generate DNA sequences of isolates for diagnostic purposes), and it is repeated that they are absolutely not mandatory.

Isolates

Figure 2:
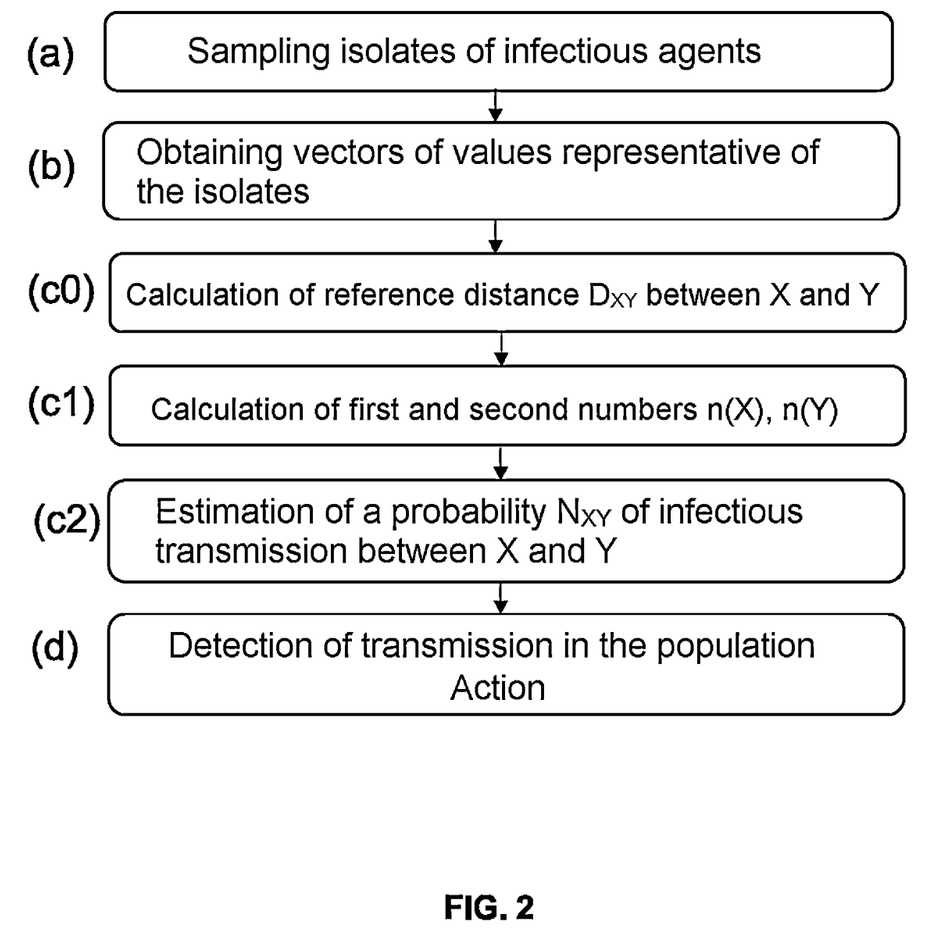
FIG. 2 schematically illustrates the steps of a preferred embodiment of the method according to the invention.

It is assumed that a plurality of isolates is available. With reference to FIG. 2, the method can begin directly with a step (b) of obtaining, by the data processing means 20 of the client 2, for a plurality of infectious agent isolates each associated with an individual of said population, a vector with values descriptive of said isolate.

These value vectors can already be stored on the data storage media 4 of the server 1 (in particular in the database mentioned), in which case this step is only a loading of these vectors, but alternatively (in particular in the case of fresh isolates, for example the daily isolates) comprises for at least one isolate the determination of the vector with values descriptive of the isolate, in particular by means of the analysis item of equipment 10 and/or the data processing means 3 of the server 1.

More specifically, the isolate is biologically analyzed to determine its value vector. In the case where said vector with values descriptive of an isolate comprises a resistance profile of the isolate and/or a list of protein peaks of the isolate, step (a) may comprise the implementation of an antibiogram to determine said resistance profile of the isolate and/or the implementation of a mass spectrometry analysis of the isolate to determine said list of protein peaks of the isolate, as typically explained through the biological analysis item of equipment 10, but also potentially the implementation of a genetic analysis and/or an observation of the isolate (for example under a microscope).

The results can be retrieved by the server 1 (advantageously automatically) and stored in said data storage medium 4 of the server 1 so as to enrich said database.

Naturally, step (b) can be preceded by a step (a) of obtaining said plurality of isolates from biological specimens taken from a plurality of individuals of said population. In practice it is necessary that each isolate be physically obtained once, and then when the vector with values descriptive of the isolate is generated and made available (in particular on the server 2), it can be reused infinitely.

The present invention typically falls within the context of a hospital in which numerous specimens are taken every day from a certain number of patients, allowing to constitute as many isolates.

It is therefore assumed at the end of step (b) that said data processing means 20 of client 2 have access to said vectors.

Neighborhood Density Metric

The present method proposes an innovative metric, called N-metric (for "neighborhood metric") or neighborhood density metric, allowing to effectively estimate the probability of direct infectious transmission between two individuals of said population, without the need for genetic analyses. The analyzes mentioned before (antibiogram and/or mass spectrometry) are indeed much more easily accessible, quick and inexpensive. Said probability of direct transmission between two individuals is, technically, the probability that there is no intermediate host between said individuals in the population. This amounts to making the simplifying assumption that all transmission takes place in this population or, equivalently, that no individual in the population can be infected by a third party outside the population.

The idea is to observe that the probability that two "similar" isolates (in phylogenetic terms) belong to a chain of transmission depends on the distribution of markers in the population of infectious agents: two similar isolates with a frequent phenotype are much less likely to be epidemiologically related than two similar isolates with a very rare phenotype. For example, a pair of phenotypically identical and unusual *Serratia marcescens* isolates are more likely to share a transmission link than an identical pair of ubiquitous *Escherichia coli*, as the latter have many more potential parents, consistent with common sense in clinical practice.

The present invention cleverly uses a quantitative and probabilistic approach to derive the probability of transmission, by considering the distribution of phenotypes in the population of infectious agents when estimating this probability. The objective is to propose an indirect measurement of the probability of direct transmission of two isolates of an infectious agent between two individuals of a population, in the absence of DNA sequences and estimates of TMRCAs between the isolates. The other advantage of this approach is that it is possible to obtain a metric then a probability which is directly exploitable, and not a time like the TMRCA which must be compared to a reference time which remains difficult to determine. More precisely, the metric and the transmission probability are directly related, and as will be seen the probability is typically inversely proportional to the metric.

Thus, in a main step (c) for each pair of a first isolate X and a second isolate Y of said plurality respectively associated with a first individual $P_X$ and a second individual $P_Y$ of said population P, said neighborhood density metric denoted $N_{XY}$ to estimate the probability $T_{XY}$ of direct infectious transmission between the first and second individuals $P_X$, $P_Y$.

Step (c) comprises a sub-step (c1) of calculating a first number of isolates n(X) corresponding to the number of isolates of said plurality having a distance to the first isolate X less than or equal to a reference distance between the first and second isolates X, Y, and a second number of isolates n(Y) corresponding to the number of isolates of said plurality having a distance to the second isolate Y less than or equal to said reference distance between the first and second isolates X, Y, each distance between two isolates being representative of a dissimilarity between the vectors of values descriptive of these two isolates.

Said reference distance between the first and second isolates X, Y, denoted $D_{XY}$, is advantageously calculated in a prior sub-step (c0).

"Dissimilarity" between two vectors means a value which is low or even zero when the vectors are identical, and high when the vectors are different. Use will not be limited to any particular distance function D and particularly it will be possible to use any norm on the space of vectors of values descriptive of isolates, and in particular define that the distance between two isolates is given as the norm of the difference of said vectors, that is to say $D_{XY}=\|V_X-V_Y\|$, with $V_X$ and $V_Y$ the respective vectors of the first and second isolate X, Y.

For example, use can thus be made of:

The Manhattan distance, that is to say $\|V_X-V_Y\|=\Sigma|V_{Xi}-V_{Yi}|$

The Euclidean distance, that is to say $\|V_X-V_Y\|=\sqrt{\Sigma(V_{Xi}-V_{Yi})^2}$ The Minkowski distance, that is to say $\|V_X-V_Y\|=\sqrt[P]{\Sigma|V_{Xi}-V_{Yi}|^P}$ The Chebyshev distance, that is to say $\|V_X-V_Y\|=\sup|V_{Xi}-V_{Yi}|$ Etc.

In a particularly preferred manner, it is even possible to use a composite distance depending on the values of said vector, that is to say depending on the parameters represented by these values, typically the Gower distance or a variant thereof.

In terms of taxa, D may be the known phylogenetic divergence between taxa estimated from the rate of evolution derived from ribosomal proteins (see Jauffrit, F., Penel, S., Delmotte, S., Rey, C., de Vienne, D. M., Gouy, M., . . . . Brochier-Armanet, C. (2016). *RiboDB Database: A Comprehensive Resource for Prokaryotic Systematics. Molecular Biology and Evolution,* 33(8), 2170-2172. doi: 10.1093/molbev/msw088). Although epidemiological transmission between different taxa has a zero probability, it is possible to keep the inter-taxa divergence for completeness and future model developments which might imply a probability of horizontal resistance gene transfer, which is proportional to the proximity taxa.

In terms of mass spectrum, D can be the divergence between the MALDI-ToF spectra (see Christner, M., Trusch, M., Rohde, H., Kwiatkowski, M., Schlüter, H., Wolters, M., . . . . Hentschke, M. (2014). *Rapid MALDI-TOF mass spectrometry strain typing during a large outbreak of Shiga-Toxigenic Escherichia coli. PloS One,* 9(7), e101924. doi: 10.1371/journal.pone.0101924). Several divergence metrics are investigated for congruence with taxon-based divergence and resistance.

In terms of resistance profile, D can be the generalized Gower's distance between resistance profiles per molecule, using quantitative data, including minimum inhibitory concentrations of molecules, when available.

In terms of morphological features, D can either be a simple Euclidean distance if the features are defined by a numerical value (for example pigmentation rate), or the Manhattan distance representing the number of features that are not identical.

In terms of genotypic information, D can be the "genetic distance" between isolates, that is to say the number of differences between the DNA sequences of the isolates.

Distances involving missing values can be calculated as the average distance between non-missing values.

Figure 3:
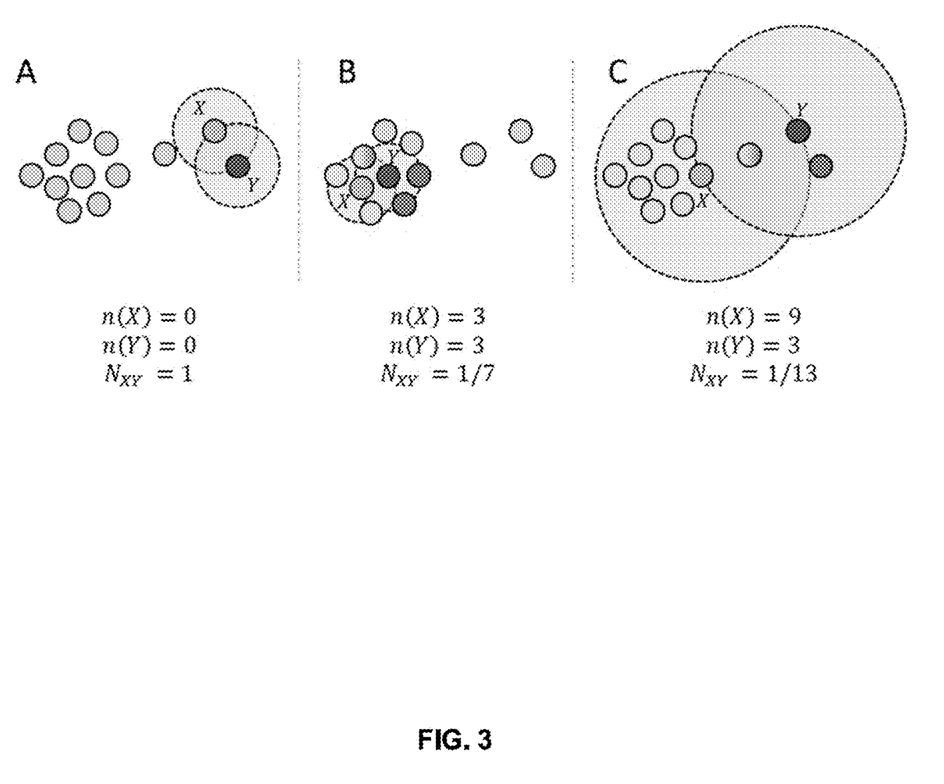
FIG. 3 shows three isolate distribution examples and the values of the first and second number of isolates and the transmission probability estimated according to an embodiment of the method according to the invention.

In all cases, the reference distance $D_{XY}$ allows to define a "neighborhood" of said first and second isolates X, Y, as can be seen in FIG. 3. In this figure, a circle of radius $D_{XY}$ centered on each of the first and second isolates X, Y has been represented for three distributions of isolates. More precisely, an isolate in the circle of radius $D_{XY}$ centered on the first isolate X has a distance to the first isolate X less than or equal to $D_{XY}$. Similarly, an isolate in the circle of radius $D_{XY}$ centered on the second isolate Y has a distance to this isolate less than or equal to $D_{XY}$. Of course, an isolate can be in both neighborhoods. Note that the "distance" here is always in terms of vector distance, that is to say dissimilarity between their vectors.

Said first and second numbers n(X) and n(Y) thus correspond to the number of isolates respectively in the vicinity of the first and second isolate X, Y.

In terms of interpretation, it is understood that the numbers n(X), n(Y) are increasing with respect to $D_{XY}$ (the more the first isolates X, Y are different, the larger their neighborhood, and therefore the greater the probability that the number of isolates found in this neighborhood is high) and decreasing in relation to their rarity (the rarer an isolate is, the less its neighborhood will contain other isolates).

Preferably, the first and second isolates X, Y are not counted in their respective neighborhoods (but only the "other" isolates of said plurality).

In FIG. 3, Example A shows two similar and rare isolates X, Y. We have n(X)=n(Y)=0. Example B shows two similar but common isolates X, Y. We have n(X)=n(Y)=3. Example C shows two dissimilar isolates X, Y, with common X. We have n(X)=9 and n(Y)=3.

It is understood that a large number of distance calculations must be performed to calculate the first and second numbers. Thus it is possible to optimize in a known manner by incorporating a pairwise dissimilarity matrix in a lower-dimensional Euclidean space by decomposition into eigenvectors, then reducing the calculations to a conventional fixed-radius near-neighbor search problem solved using efficient and parallelizable methods (for example the t-SNE method "distributed stochastic neighbor embedding").

In a step (c2), the probability $T_{XY}$ of direct infectious transmission between the first and second individuals is estimated as a function of said first and second number of isolates n(X), n(Y), preferably only as a function of the first and second numbers n(X), n(Y).

As explained, this step (c2) preferably comprises the intermediate calculation of the neighborhood density metric $N_{XY}$ associated with the pair of isolates X, Y, as a function of their first and second numbers n(X), n(Y), preferably only as a function of the first and second numbers n(X), n(Y); the probability $T_{XY}$ of direct infectious transmission between the first and second individuals $P_X$. $P_Y$ then being estimated from the metric $N_{XY}$, preferably only as a function of the metric $N_{XY}$. It remains of course possible to directly calculate the probability $T_{XY}$ from the first and second numbers n(X), n(Y).

The present method is not limited to a particular formula linking the neighborhood density metric $N_{XY}$ with n(X) and n(Y), or to a particular formula linking the transmission probability $T_{XY}$ with the metric $N_{XY}$, it suffices that $T_{XY}$ decreases when the first and/or the second number of isolates n(X), n(Y) increases, and in particular that $N_{XY}$ increases when the first and/or the second number n(X), n(Y) increases and that $T_{XY}$ decreases when $N_{XY}$ increases. Indeed, the number of isolates in a neighborhood testifies to the variety of possible alternatives to a direct infectious transmission between X and Y. The more the neighborhoods are "populated", or dense, the more the origin of the transmission in the population of hosts can be multiple and therefore the more uncertain a direct transmission between X and Y is. On the contrary, if the neighborhoods are empty, or not very dense, this means that there are no other possible paths than a transmission between X and Y. In other words, the likelihood of a direct transmission between X and Y decreases with the density of the neighborhood of X and Y.

Preferably, the formulas $N_{XY}=1+n(X)+n(Y)$ and $T_{XY}=1/N_{XY}$, which are combined to obtain $T_{XY}=1/(1+n(X)+n(Y))$. Many other formulas can be used such as $N_{XY}=(1+n(X))(1+n(Y))$ and/or $T_{XY}=e^{-N_{XY}}$, etc.

In FIG. 3, Example A shows two similar and rare isolates X, Y. We have $T_{XY}=1/(1+0+0)=100\%$. Example B shows two similar but common isolates X, Y. We have $T_{XY}=1/(1+3+3)=14.3\%$. Example C shows two dissimilar isolates X, Y, with common X. We have $T_{XY}=1/(1+9+2)=8.3\%$.

In a step (d), infectious transmission is detected or not in said population as a function of the estimated probabilities $T_{XY}$ of direct infectious transmission between each pair of individuals.

For example, transmission can be determined to have occurred if there is at least one pair of a first isolate X and a second isolate Y for which the probability $T_{XY}$ of direct infectious transmission between the first and second individuals $P_X$. $P_Y$ associated with these isolates is greater than a given threshold, called the decision threshold, for example 80%, even if the person skilled in the art can use any classifier of his choice.

The possible decision threshold can thus be predetermined, but alternatively and preferably it can also be calculated in step (d), on the basis of said probabilities $T_{XY}$ but also of infectious transmission probabilities calculated for a pair of isolates of said plurality associated with the same individual (that is to say a first and a second isolate $X_1$ and $X_2$ from the same individual $P_X$, probability incorrectly denoted $T_{XX}$ for the individual $P_X$). It will of course be understood that the notion of "direct infectious transmission" no longer applies if the first and the second individual are the same, and "reference" probability (for said individual $P_X$) will rather be considered.

As such, step (c) is advantageously also implemented for each pair of a first isolate $X_1$ and a second isolate $X_2$ of said plurality associated with the same individual of said population (that is to say in the end for each possible pair of isolates). Exactly the same steps (c1) and (c2) apply for these pairs.

Thus, the decision threshold can be obtained by comparing the distribution of the values of the probabilities T in two subsets of pairs of isolates from said plurality of isolates, that is to say two subsets of the set of possible pairs, the first subset being made up of pairs of isolates from the same individual (so-called "intra-patient" pairs, probabilities denoted $T_{XX}$) and the second subset being made up of pairs of isolates from different individuals (so-called "inter-patients", probabilities denoted $T_{XY}$). The decision threshold chosen is for example the value separating the two groups of probability values as well as possible, it can be obtained by any discriminant analysis method, for example a minimization of the sum of the number of $T_{XX}$ less than the threshold and of $T_{XY}$ greater than the threshold.

Indeed, naturally the reference probabilities $T_{XX}$ are on average higher than the probabilities $T_{XY}$, since it is almost possible to be certain that the two isolates associated with the same individual share the same recent origin. If the value of $T_{XY}$ between isolates from different individuals is comparable to the probability values $T_{XX}$ previously observed between isolates from the same individual, then the TMRCA of this pair of isolates from different individuals is comparable to the TMRCA that it would be observed if the isolates came from a single individual: this situation indicates recent transmission.

This preferential method for determining the decision threshold has the advantage of being able to be applied directly to all the infectious agents present in the population, provided that a sufficient number of pairs of intra-patient and inter-patient isolates are available, and so that the decision threshold obtained for each infectious agent reflects the diversity of the profiles of the isolates (obtained by the analyzes mentioned above, including antibiogram and/or mass spectrometry) in the population within which infectious transmission must be detected.

In FIG. 3, it can therefore be concluded that there is direct infectious transmission between $P_X$ and $P_Y$ in Example A since $T_{XY}=100\%$, and therefore a transmission in said population is detected. This step (d) can comprise the triggering of an alert on the interface 22 of the client 2 but also the implementation of an action on said population according to the result of the detection, in particular measures to combat infection in the event of proven detection, for example the allocation of resources to hygiene services and/or the implementation of samples on a larger scale. In particular, the detection of transmission in a hospital ward may result in complete disinfection of the ward and/or systematic testing of all patients.

Alternatively or in addition, step (d) may comprise the verification of a transmission detected by genetic analysis. Indeed, there will be at most a handful of transmissions between individuals with a high probability, so that the number of genetic tests remains low and can be carried out quickly.

Tests

The performance of the present method for detecting an infectious transmission has been verified on a simulation model of the transmission of an infectious agent in a host population. This model also simulates the evolution of the resistance profile of the infectious agent, represented as a binary vector where the susceptibility to an antibiotic is represented by 0 and the resistance is represented by 1. The binary resistance profile is chosen as the preferred representation of the vector with values descriptive of each isolate. Use is typically made of a vector of length 24, that is to say 24 antibiotics tested, in accordance with the usual practices in medical bacteriology. Importantly, the binary resistance profile is the type of descriptive values with the lowest resolution (compared to CMI for example). Thus, this type of descriptive value is representative of unfavorable application conditions, limiting the risk of overestimating the actual performance of the detection method.

In the simulation model, the pathogen evolves in the form of a random pedigree (phylogeny). The simulation begins with a single lineage (individual) of the infectious agent present in a single patient. Over time, each lineage of the pathogen gives rise to two lineages until a defined number of isolates are sampled from the population. Over time, each lineage of the pathogen can be transmitted from one patient to another with a transmission rate $R_{trans}$, typically $R_{trans}=1$ (dimensionless quantity). Each lineage of the infectious agent can evolve towards resistance (or lose this resistance) to an antibiotic with a rate of evolution $R_{evol}$ slower than the rate of transmission, typically $R_{evol}=0.05$. The proportion $P_{res}$ of resistance at the equilibrium of the model represents the antibiotic pressure in the host population. This proportion is typically moderate for hospital pathogens, $P_{res}=0.25$. These parameters allow to obtain simulated resistance profiles in agreement with real data, in which the majority of infectious agents are very sensitive and only a few infectious agents accumulate many resistances.

At the end of each simulation, the length of the chain of transmission between each pair of isolates is calculated. The length of the chain of transmission is defined as the number of different patients having been colonized by all the ancestors of each isolate up to their most recent common ancestor. Pairs of isolates present in the same patient are ignored (trivial chain of transmission, of length 1). Pairs of isolates with a chain of transmission of length 2 are categorized as directly transmitted. Pairs of isolates with a chain of transmission longer than 2 are categorized as not directly transmitted, since an intermediate host is involved in transmission. Once this data has been obtained, the present method is used to detect whether a pair of isolates has been directly transmitted, using as input data the binary resistance profiles of the pair of isolates to the exclusion of any other data.

For each pair of isolates from different patients, the reference distance $D_{XY}$ is taken as the proportion of differences in the binary vector representing the resistance profile (Manhattan distance).

The neighborhood density metric $N_{XY}$ and the probability $T_{XY}$ of direct infectious transmission are calculated as described previously ($N_{XY}=1+n(X)+n(Y)$ and $T_{XY}=1/N_{XY}$).

The simulation is repeated 400 times on a final population of 200 isolates evolving in a population of 100 potential hosts. The performance measurements (Table 1) show that the performance of detecting a direct transmission by a classifier based on the neighborhood density $N_{XY}$ is not only high (area under the ROC curve >0.90) but surpasses the performance of a classifier based on dissimilarity (that is to say the reference distance $D_{XY}$), with a median odds ratio that is higher by a factor of 1.64 and lower rates of false positives and false negatives. The area under the ROC curve of the neighborhood density classifier was higher than that of the dissimilarity classifier in 96.1% of the simulations.

These simulations indicate that even under unfavorable conditions, using an antibiogram-based low-resolution descriptive value vector, a neighborhood density-based classifier can detect directly transmitted pairs of isolates with high performance, and that these performances surpass those of a classifier based on a measure of dissimilarity.

TABLE 1

|  | Predictor (median and IQR) | |
| --- | --- | --- |
|  | Dissimilarity | N-metric |
| Area under the ROC curve | 0.88 [0.85 to 0.90] | 0.91 [0.88 to 0.93] |
| odds ratio | 17.5 [12.8 to 26.0] | 28.7 [19.1 to 43.6] |
| % false negatives | 19.6 [15.2 to 25.5] | 16.5 [11.8 to 21.9] |
| % false positives | 18.4 [14.6 to 22.4] | 14.9 [12.4 to 18.1] |

Item of Equipment, Computer Program Product

According to a second aspect, the invention relates to an item of equipment for detecting an infectious transmission in a population for the implementation of the method according to the first aspect, that is to say the client 2.

As explained, this item of equipment 2 comprises data processing means 20 configured to implement steps of:
- (b) For a plurality of infectious agent isolates each associated with an individual of said population, obtaining a vector with values descriptive of said isolate;
- (c) for each pair of a first isolate X and a second isolate Y of said plurality respectively associated with a first individual $P_X$ and a second individual $P_Y$ of said population:
  - (c1) calculating a first number of isolates n(X) corresponding to the number of isolates of said plurality having a distance to the first isolate X less than or equal to a reference distance $D_{XY}$ between the first and second isolates (X, Y (if applicable after (c0) calculating the reference distance $D_{XY}$ between the first and second isolates X, Y), and a second number of isolates n(Y) corresponding to the number of isolates of said plurality having a distance to the second isolate Y less than or equal to said reference distance $D_{XY}$ between the first and second isolates X, Y, each distance between two isolates being representative of a dissimilarity between the vectors of values descriptive of these two isolates;

(c2) estimating a probability $T_{XY}$ of direct infectious transmission between the first and second individuals as a function of said first and second number of isolates n(X), n(Y);

(d) Detecting or not detecting an infectious transmission in said population as a function of the estimated probabilities $T_{XY}$ of direct infectious transmission between each pair of individuals According to a third aspect, the invention relates to a system comprising an item of equipment 2 according to the second aspect and a server 1 comprising data storage media 4 storing a database of infectious agent isolates (each represented by a vector with values), and optionally an item of equipment 10 for the biological analysis of infectious agent isolates, for the determination of said vectors of values representative of the isolates.

According to a fourth and a fifth aspect, the invention relates to a computer program product comprising code instructions for the execution (in particular on the data processing means 3, 20 of the server 1 and/or of the client 2) of a method according to the first aspect of detecting an infectious transmission in a population, as well as storage media readable by computer item of equipment (a memory 4, 21 of the server 1 and/or of the client 2) on which this computer program product is located.

The invention claimed is:

1. A method for detecting an infectious transmission in a population, implemented by data processing means (20) of a client (2), the method comprising:
   (b) receiving from a server (1) comprising data storage media (4) storing a database of infectious agent isolates, a plurality of infectious agent isolates each associated with an individual of a population, each infectious agent isolate being defined by a vector with values descriptive of the isolate, the vector comprising a resistance profile of the isolate and/or a list of protein peaks of the isolate;
   (c) for each pair of a first isolate (X) and a second isolate (Y) of the plurality respectively associated with a first individual and a second individual of the population:
      (c1) calculating a first number of isolates (n(X)) corresponding to the number of isolates of the plurality having a distance to the first isolate (X) less than or equal to a reference distance between the first and second isolates (X, Y), and a second number of isolates (n(Y)) corresponding to the number of isolates of said plurality having a distance to the second isolate (Y) less than or equal to the reference distance between the first and second isolates (X, Y), each distance between two isolates being representative of a dissimilarity between the vectors of values descriptive of these two isolates;
      (c2) estimating a probability ($T_{XY}$) of direct infectious transmission between the first and second individuals as a function of the first and second number of isolates (n(X), n(Y));
   (d) detecting or not detecting an infectious transmission in the population as a function of the estimated probabilities ($T_{XY}$) of direct infectious transmission between each pair of individuals.

2. The method according to claim 1, wherein step (c) comprises a preliminary sub-step (c) of calculating the reference distance ($D_{XY}$) between the first and second isolates (X, Y).

3. The method according to claim 1, wherein the probability ($T_{XY}$) of direct infectious transmission between the first and second individuals decreases when the first and/or the second number of isolates (n(X), n(Y)) increases.

4. The method according to claim 3, wherein the probability $T_{XY}$ of direct infectious transmission between the first and second individuals is given by the formula $T_{XY}=1/(1+n(X)+n(Y))$, where n(X) is the first number of isolates and n(Y) is the second number of isolates.

5. The method according to claim 1, wherein step (b) comprises, for each isolate of the plurality, the implementation of an antibiogram to determine the resistance profile of the isolate and/or the implementation of a mass spectrometry analysis of the isolate to determine the list of protein peaks of the isolate and/or the implementation of a genetic analysis of the isolate to determine the genotypic information of the isolate and/or an observation of the isolate to determine said morphological characteristics of the colonies of the isolate.

6. The method according to claim 1, comprising a step (a) of obtaining the plurality of isolates from biological specimens taken from a plurality of individuals of the population.

7. The method according to claim 1, wherein an infectious transmission in the population is detected in step (d) if there is at least one pair of a first isolate (X) and a second isolate (Y) of the plurality respectively associated with a first individual and a second individual of the population such that the probability ($T_{XY}$) of direct infectious transmission between the first and second individuals estimated in step (c2) is greater than a decision threshold.

8. The method according to claim 1, wherein step (c) is also implemented for each pair of a first isolate ($X_1$) and a second isolate ($X_2$) of said plurality associated with the same individual of the population so as to estimate a reference probability ($T_{XX}$), step (d) comprising the calculation of the decision threshold as a function of the probabilities ($T_{XY}$) of direct infectious transmission and of the reference probabilities ($T_{XX}$).

9. The method according to claim 1, wherein step (d) comprises the implementation of an action on the population according to the result of the detection.

10. The method of claim 9, wherein the action is selected from measures to combat infection, the allocation of resources to hygiene services, and the implementation of samples on a larger scale.

11. The method of claim 9, wherein the action is complete disinfection of a hospital ward or systematic testing of all patients in the ward.

12. The method of claim 9, wherein the action is the verification of the detected transmission by genetic analysis.

13. A computer program product comprising code instructions for the execution of a method according to claim 1 for detecting an infectious transmission in a population, when the program is executed on a computer.

14. A storage medium readable by computer item of equipment on which a computer program product comprises code instructions for the execution of a method according to claim 1 for detecting an infectious transmission in a population.

15. An item of equipment (2) for detecting an infectious transmission in a population, comprising data processing means (20) configured to implement steps of:

(b) receiving from a server (1) comprising data storage media (4) storing a database of infectious agent isolates, a plurality of infectious agent isolates each associated with an individual of a population, each infectious agent isolate being defined by a vector with values descriptive of said isolate, the vector comprising a resistance profile of the isolate and/or a list of protein peaks of the isolate;

(c) for each pair of a first isolate (X) and a second isolate (Y) of the plurality respectively associated with a first individual and a second individual of the population:

(c1) calculating a first number of isolates (n(X)) corresponding to the number of isolates of the plurality having a distance to the first isolate (X) less than or equal to a reference distance between the first and second isolates (X, Y), and a second number of isolates (n(Y)) corresponding to the number of isolates of said plurality having a distance to the second isolate (Y) less than or equal to said reference distance between the first and second isolates (X, Y), each distance between two isolates being representative of a dissimilarity between the vectors of values descriptive of these two isolates;

(c2) estimating a probability ($T_{XY}$) of direct infectious transmission between the first and second individuals as a function of the first and second number of isolates (n(X), n(Y));

(d) detecting or not detecting an infectious transmission in the population as a function of the estimated probabilities ($T_{XY}$) of direct infectious transmission between each pair of individual.

16. A system comprising an item of equipment (2) according to claim 15 and a server (1) comprising data storage media (4) storing a database of infectious agent isolates, and optionally an item of equipment (10) for the biological analysis of infectious agent isolates.

* * * * *